US008280894B2

(12) United States Patent
Bohn et al.

(10) Patent No.: US 8,280,894 B2
(45) Date of Patent: Oct. 2, 2012

(54) METHOD AND SYSTEM FOR MAINTAINING ITEM AUTHORITY

(75) Inventors: Shawn Bohn, Mill Creek, WA (US);
Anmol Paralkar, Maharastra (IN);
Anuvrata Arora, Issaquah, WA (US);
Nicholas Bicknell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2532 days.

(21) Appl. No.: 10/350,144

(22) Filed: Jan. 22, 2003

(65) Prior Publication Data

US 2004/0143508 A1   Jul. 22, 2004

(51) Int. Cl.
*G06F 7/00* (2006.01)
*G06Q 30/00* (2012.01)
(52) U.S. Cl. ............. 707/752; 707/737; 705/26.61; 705/27.1
(58) Field of Classification Search ............ 707/3, 201, 707/752, 737; 705/26, 27
See application file for complete search history.

(56) References Cited

U.S. PATENT DOCUMENTS

| | | | |
|---|---|---|---|
| 5,659,742 A | 8/1997 | Beattie et al. | |
| 5,819,291 A * | 10/1998 | Haimowitz et al. | 707/201 |
| 6,266,649 B1 * | 7/2001 | Linden et al. | 705/7.29 |
| 6,405,175 B1 | 6/2002 | Ng | |
| 6,601,075 B1 | 7/2003 | Huang et al. | |
| 6,625,581 B1 * | 9/2003 | Perkowski | 705/27.1 |
| 6,785,671 B1 * | 8/2004 | Bailey et al. | 705/26.81 |
| 2003/0069880 A1 | 4/2003 | Harrison et al. | |
| 2003/0097357 A1 * | 5/2003 | Ferrari et al. | 707/3 |

OTHER PUBLICATIONS

International Search Report for International Application No. PCT/US04/00930, Dec. 23, 2004.
Hernandez, M.A. et al., "The Merge/Purge Problem for Large Databases," *Proceedings of the 1995 ACM SIGMOD International Conference on Management of Data*, pp. 127-138, San Jose, CA, May 1995.
Monge, A. E. et al., "An Efficient Domain-Independent Algorithm for Detecting Approximately Duplicate Database Records," *Proceedings of the SIGMOD 1997 Workshop on Research Issues on Data Mining and Knowledge Discovery*, pp. 23-29, Tuscon, AZ, May 1997.
Nahm, U.Y. et al., "Mining Soft-Matching Rules from Textual Data," *Proceedings of the Seventeenth International Joint Conference on Artificial Intelligence*, pp. 979-984, Seattle, WA, Aug. 2001.
Winkler, William, E., "Advanced Methods for Record Linkage," Bureau of the Census, Washington, DC, pp. 467-472, 1994.
Cohen, W., et al., "Learning to Match and Cluster Entity Names," *ACM SIGIR-2001 Workshop on Mathematical/Formal Methods in Information Retrieval*, New Orleans, LA, Sep. 2001.
Nahm, U.Y. et al., "Mining Soft-Matching Association Rules," Proceedings of the Eleventh International Conference on Information and Knowledge Management, pp. 681-683, McLean, VA, Nov. 2002.

* cited by examiner

*Primary Examiner* — Apu Mofiz
*Assistant Examiner* — Chelcie Daye
(74) *Attorney, Agent, or Firm* — Robert C. Kowert; Meyertons, Hood, Kivlin, Kowert & Goetzel, P.C.

(57) ABSTRACT

An item authority system is provided. The item authority system uses rules to identify item definitions that match or potentially match an item description. When a unique match is found, then the item authority system may indicate that the item description describes the same item as the item definition. If multiple matches or only potential matches are identified, then the item authority system may allow a user to manually indicate which item definition matches.

53 Claims, 17 Drawing Sheets

| Item Description Search -- Unmatched | 1500
Match |

Name: _____
Brand: _____  } 1501
MPN: _____
Price: _____
 .
 .

Search
1502

FIG. 15

METHOD AND SYSTEM FOR MAINTAINING ITEM AUTHORITY

TECHNICAL FIELD

The described technology relates generally to matching item descriptions to item definitions.

BACKGROUND

Some electronic commerce web sites allow many merchants to advertise and sell their products and services, referred to as items, through a single web site. The web site may maintain a product catalog that describes all the products of all the merchants that are available to be purchased through the web site. In addition, the web site may maintain a record of the inventory for each merchant. A customer who desires to purchase a product through the web site may browse or use a search engine to search the product catalog for a product of interest. When a product of interest is found, the web site may identify from an inventory table the merchants who have the product of interest in stock, their price for the product of interest, shipping terms, and so on. The customer can then purchase the product of interest from a merchant who, for example, is offering the lowest price. The web site may coordinate the collecting of payment information and shipping information from the customer. The web site then notifies the merchant, who ships the product according to the shipping information. The web site may collect the payment from a financial institution, such as a credit card company. The web site may then keep a commission on the sale of the product and pay the rest to the merchant. The web site may also update the inventory for the merchant to reflect the sale of the product.

These web sites may provide various services that allow a merchant to update its inventory information maintained by the web site. For example, the web site may provide a bulk loader that uploads a file of current inventory information from a merchant. The bulk loader may scan the inventory information to ensure that it is in the correct format before updating the existing inventory information for that merchant. The inventory information needs to be mapped to the product in the product catalog associated with each product whose inventory information is being uploaded. For example, if a product is a book, then the inventory information may include the international standard book number ("ISBN") for that book. The product catalog will contain an entry with that ISBN that describes the book. If each product in inventory is mapped to a product in the product catalog, then, when a customer browses the product catalog, the web site can identify and display the corresponding inventory of that product.

Unfortunately, there may not be an industry standard way to uniquely identify each product that is in inventory. As a result, the uploaded inventory information may not correctly or uniquely be associated with a product in the product catalog. The uploaded inventory information may, nevertheless, include attributes of the product, such as title, publisher, manufacturer, part number, and price, that may help to uniquely identify a corresponding product in the product catalog. Even if there was an industry standard way to uniquely identify each product, the merchants might not use that unique identification in their own databases and thus have no easy way for providing that unique identification when uploading their inventory information. In addition, since there may be hundreds of thousands of products in the product catalog, even if each merchant attempted to use the unique identification, it would be expected that various errors in the identification itself would occur. For example, a data entry operator for a merchant may mistype the unique identification or simply enter the wrong identification. In addition, merchants may attempt to upload information relating to new products that have not yet been defined in the product catalog. It would be desirable to have a system that would automatically match products in inventory to products in the product catalog and, when not possible, to facilitate the manual matching of products in inventory to products within the product catalog.

BRIEF DESCRIPTION OF THE DRAWINGS

FIG. 15 is a display page illustrating entry of a search specification for unmatched item descriptions in one embodiment.

DETAILED DESCRIPTION

Figure 1:
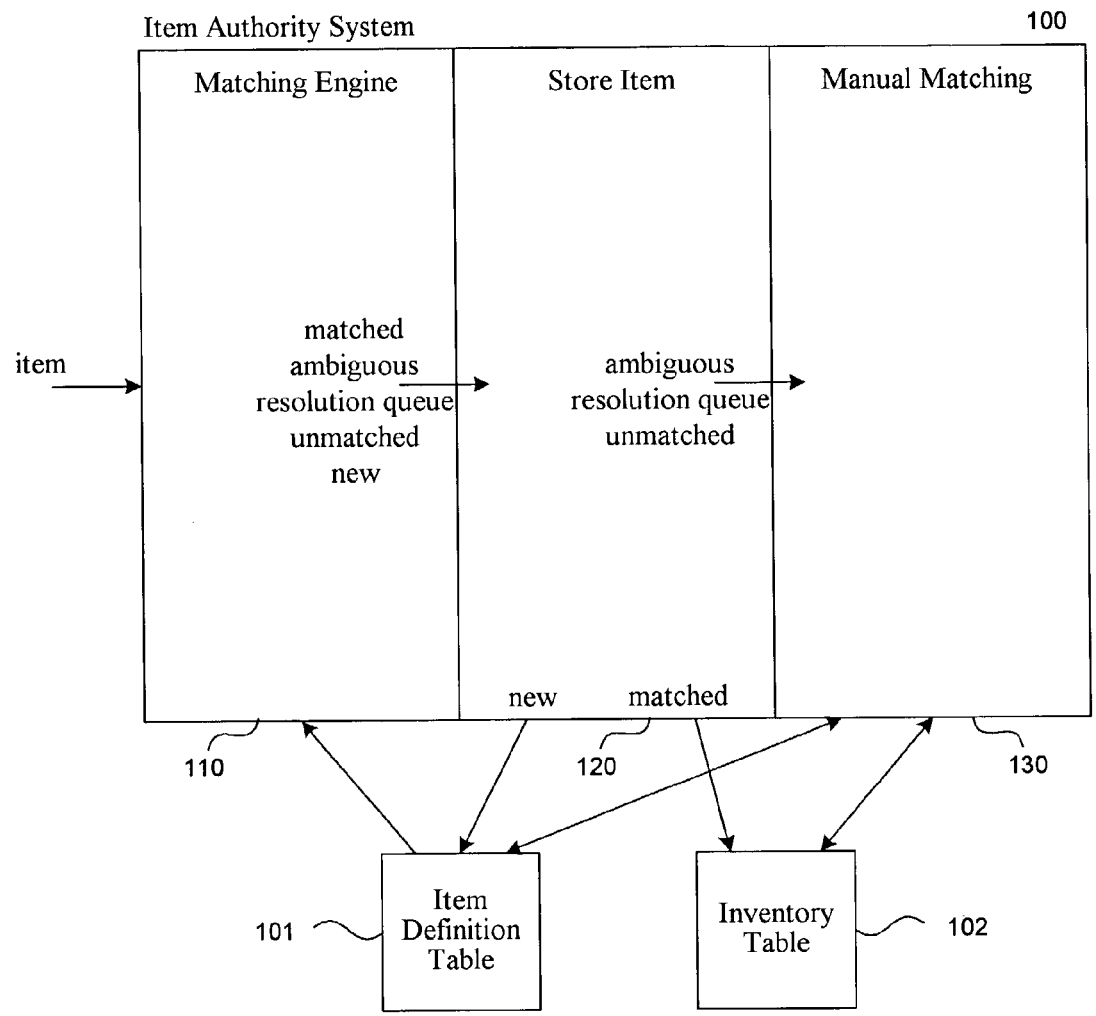
FIG. 1 is a block diagram illustrating the subsystems of the item authority system in one embodiment.

A method and system for automatically identifying item definitions that match item descriptions is provided. In one embodiment, the item authority system provides a matching engine that receives an item description (e.g., corresponding to an item in inventory) and compares that item description to various item definitions (e.g., corresponding to products in the product catalog). The item definitions provide what are considered authoritative definitions of each item. For example, an item definition may include an industry standard unique identifier for the item or may include values for attributes (e.g., title) that uniquely identify the item. The matching engine identifies the item definition that is most similar to the item description as the matching item definition.

The item definition may improve over time as the definition is augmented by additional information or corrected with more accurate information.

The matching engine, in one embodiment, uses rules that specify how the similarity between an item definition and an item description is to be determined. These rules specify how to calculate a similarity score for an item definition and an item description based on a comparison of their attributes. A rule may also specify a threshold similarity score that is to be met in order for an item definition to match an item description. For example, if the similarity score between an item definition and an item description is 0.8 and the threshold similarity score is 0.75, then the item definition and the item description may be considered a match. If the threshold similarity score is 0.9, however, then the item definition and the item description would not be considered a match. In one embodiment, a rule may specify multiple ways, referred to as "filters," to calculate similarity scores. For example, if the item is a book, then one similarity score may be calculated based on the similarity between the ISBNs in the item description and the item definition, and another similarity score may be calculated based on the similarity between title and author attributes of the item description and item definition. In one embodiment, when a similarity score is calculated based on multiple attributes, the similarity score may be a weighted combination of the similarity scores for each attribute. For example, the weight for the title attribute may be 0.75 and the weight for the author attribute may be 0.25, which indicates that the similarity between the titles is more indicative of a match than the similarity between the authors. Each way to calculate a similarity score, that is, each filter, may have its own threshold similarity score that indicates whether the item description and item definition match. Thus, in this example, if the ISBNs are identical, then the item description and item definition may be considered a match. If, however, the ISBN is missing from the item description, then the item description and the item definition may be considered a match when the title and author are very similar.

When the matching engine identifies only one item definition with a similarity score above the threshold similarity score, then the matching engine indicates that the item definition matches the item description. In such case, the item described by the item description may be added to the inventory corresponding to the matching item definition. If, however, the matching engine identifies more than one item definition with a similarity score above the threshold similarity score, then the matching engine identifies the item description as ambiguous. In such case, the item authority system may provide a manual matching subsystem through which a user can resolve the ambiguity. If the similarity score of no item definition exceeds the threshold similarity score, but at least one item definition has a similarity score that indicates it is a potential match (i.e., above a nearly matched threshold similarity score), then the matching engine may provide the item description and the potential matching item definitions to the manual matching subsystem so that a user can manually identify a matching item definition, as appropriate. These potential matching item definitions are placed in a "resolution queue" waiting for manual intervention.

If the matching engine does not identify any potential matching item definitions, then the matching engine determines whether the item description qualifies as a new item for which a new item definition should be defined. If the item description qualifies, then a new item definition is added to the product catalog. If the item description does not qualify, then the matching engine may place it in the resolution queue waiting for manual intervention. In such a case, a user would need to manually indicate a matching item definition or indicate that a new item definition is to be defined. Alternatively, the matching engine may discard the item description if it does not match any item definition and does not qualify for addition to the product catalog. In this way, the item authority system automatically identifies the matching item definition for an item description when possible, and when not possible it provides potential matching item definitions to assist in manual matching or discards the item description. The collection of item definitions (e.g., a product catalog) may be considered the "item authority" since it is the authoritative definition of the items.

The item authority system, in one embodiment, includes a manual matching subsystem that facilitates the matching of item descriptions to item definitions that cannot be automatically matched. The matching engine provides to the manual matching subsystem the item descriptions for which a match cannot be identified along with any ambiguous matching or potential matching item definitions that have been identified. The manual matching subsystem provides a user interface that allows a user to view the unmatched item descriptions (i.e., those in the resolution queue) along with the ambiguous matching and potential matching item definitions. The user can request detailed information about the item definitions and manually indicate which item definition, if any, matches the item description. When none of the ambiguous or potential matching item definitions match the item description, the manual matching subsystem may allow the user to search for other item definitions that may match the item description. The manual matching system may also allow a user to merge item definitions into a single item definition or to update existing item definitions with additional information. It is possible that multiple item definitions may refer to the same underlying item. This may occur, for example, because the matching engine incorrectly identified that an item description represented a new item definition. The manual matching engine may also allow the user to review the automatic matches made by the matching engine and to override the matches when appropriate. Thus, the item authority system provides for the automatic matching of item description and item definitions when possible and, when not possible, provides for manual matching.

FIG. 1 is a block diagram illustrating the subsystems of the item authority system in one embodiment. The item authority system 100 includes matching engine subsystem 110, store item subsystem 120, and manual matching subsystem 130. One skilled in the art will appreciate that these subsystems represent one possible division of the functions of the item authority system. The functions of the item authority system may be divided into subsystems in different ways or not divided at all. The item authority system interacts with the item definition table 101 and the inventory table 102. The item definition table, which may correspond to a product catalog, contains the authoritative item definition of each item. The inventory table contains the inventory information for each item that is available to be purchased. The inventory information may include the name of the merchant, the price of the item, shipping information, a unique identifier of the matching item definition in the item definition table, and other information about the item. The matching engine subsystem receives item descriptions and attempts to identify the matching item definition. The matching engine then provides the item description to the store item subsystem along with the status of the item description and the identification of any matching or potentially matching item definitions. In one embodiment, the status may be set to matched, ambiguous, resolution queue, unmatched, and new. The status of matched indicates that the item description matches a unique item definition. The status of ambiguous indicates that the item description matches more than one item definition. The status of resolution queue indicates that one or more potential matching item definitions have been identified, but none qualifies as a match. In one embodiment, the ambiguous and resolution queue statuses may be combined into a single status since the distinction between multiple matching item definitions and one or more potential matching item definitions may not be important to a user who is using the manual matching subsystem. The status of new means that the item description represents a new item definition that can be automatically added to the item definition table. The status of unmatched means that no matching or potentially matching item definitions have been found and the item description does not meet the criteria for automatically creating a new item definition. The store item subsystem receives the item description, status, and matching or potential matching item definitions from the matching engine subsystem. The store item subsystem updates the inventory table based on the item descriptions indicating whether a match has been found and adds new entries to the item definition table for the item descriptions with a status of new. The store item subsystem passes a list of (or an identification of) the unmatched item descriptions to the manual matching subsystem. The manual matching subsystem provides a user interface that allows a user to manually match item descriptions in the resolution queue to item definitions and to perform other tasks as discussed below in more detail.

Figure 2:
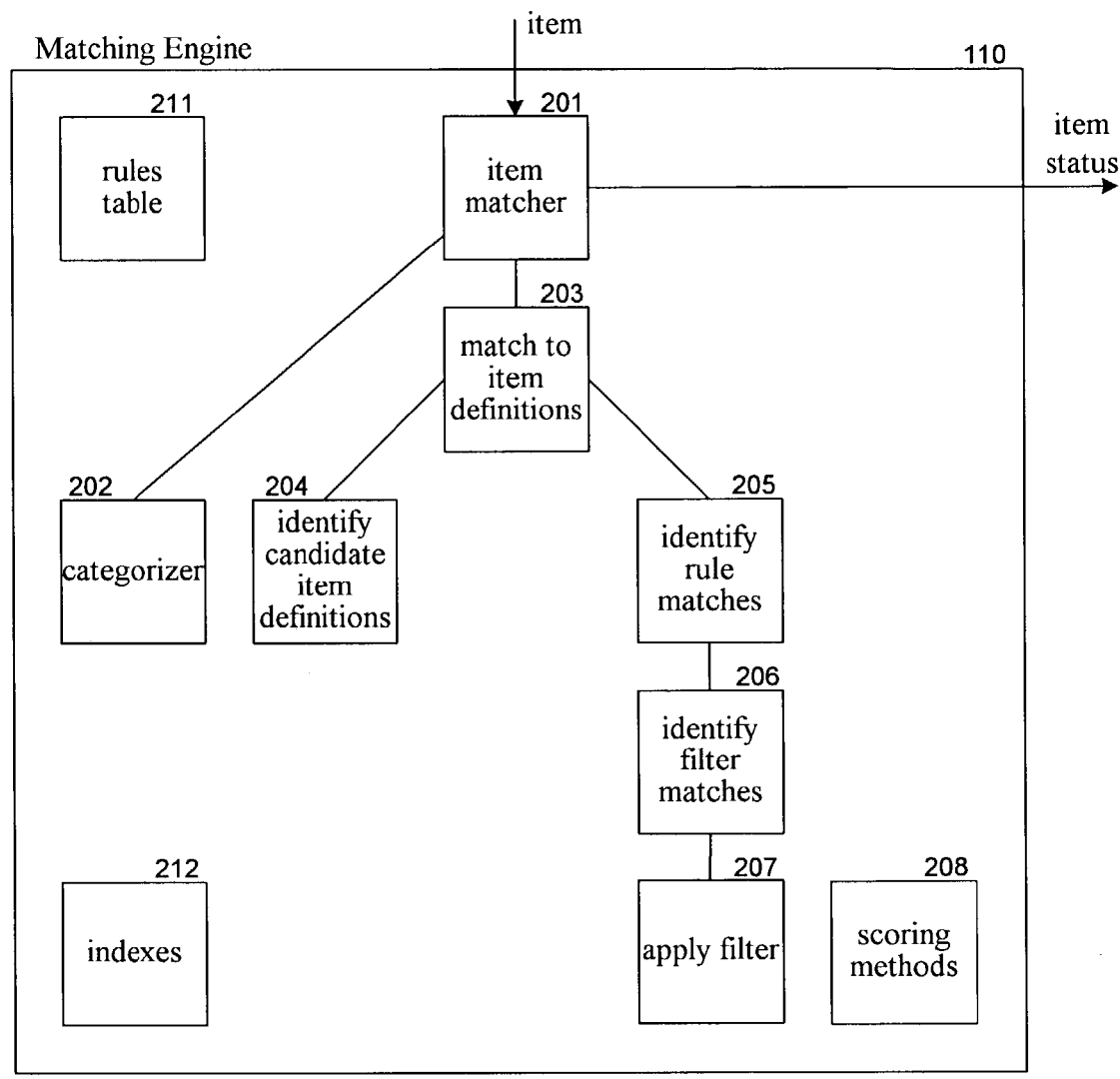
FIG. 2 is a block diagram illustrating components of the matching engine subsystem in one embodiment.

FIG. 2 is a block diagram illustrating components of the matching engine subsystem in one embodiment. The matching engine subsystem 110 includes components 201-208 that perform the matching functions, rules table 211, and indexes 212. In one embodiment, the components are implemented as a computer program that executes on a computer system. The organization of these components illustrates one possible organization. One skilled in the art will appreciate that the function of the matching engine can be organized into components in many different ways. The item authority system may be implemented on one or more computer systems that receive item descriptions via a communications link. Each computer system may include a central processing unit, memory, input devices (e.g., keyboard and pointing devices), output devices (e.g., display devices), and storage devices (e.g., disk drives). The memory and storage devices are computer-readable media that may contain instructions that implement the item authority system. In addition, the data structures and message structures include requests and responses that may be stored or transmitted via a data transmission medium such as a signal on the communications link. The matching engine subsystem, the store item subsystem, and the manual matching subsystem may each execute on a different computer system or may execute on the same computer system. One skilled in the art will appreciate that the particular arrangement of the item authority system can be customized to meet the performance goals of the system.

The rules table 211 of the matching engine contains various rules for each category of items. For example, the rules table may contain a set of rules for a book category of items and a separate set of rules for a consumer electronics category of items. In one embodiment, each rule contains one or more filters that specify a criterion for an item description to match an item definition. Each filter specifies one or more attributes and a scoring algorithm for quantitatively representing the similarity between an item description and an item definition.

The indexes 212 allow rapid access to entries of the item definition table 101 that match certain values. In one embodiment, an index for each attribute represented by a filter of a rule is generated. For example, if a rule for a category of books has a filter that specifies an ISBN attribute and a title attribute, then an index for the ISBN attribute and another index for the title attribute is created. The matching engine uses the indexes to quickly identify item definitions corresponding to a given attribute value. In one embodiment, the indexes may be updated on a periodic basis, such as daily, to reflect changes in the item definition table. With only periodic updating, the indexes may not represent the current state of the item definition table. In particular, item definitions may have been added to the item definition table after the indexes were last generated. Because the indexes may be out of date, after searching the indexes the matching engine may search all newly defined items in the item definition table (i.e., those items defined after the last index update) before adding a new item definition to the item definition table to ensure that a duplicate item definition for the same item is not created.

The item matcher component 201 controls the overall processing of the matching engine. The item matcher component receives an item description and outputs the item description and its status along with an indication of any matching or potentially matching item definitions. The item matcher component initially uses categorizer 202 to identify the category associated with the item description. The category is identified by looking at certain data fields in the item description. For example, the categorizer may examine a field representative of product type (e.g., consumer electronics, toys) and a second field representative of product sub-type (e.g., DVDs, stuffed animals). The values of these fields are mapped to different user-defined categories. The item matcher component then retrieves the rules for the identified category from the rules table 211. The item matcher component then invokes the match to item definitions component 203 to identify item definitions that match the item description based on the rules for that category.

The item matcher component 201 sets the status for the item description based on the identified category rules and the matching and potential matching item definitions. The match to item definitions component initially identifies candidate item definitions using the identify candidate item definitions component 204. The candidate item definitions represent the set of item definitions that are selected for detailed analysis as to whether they match the item description. Since there may be hundreds of thousands of item definitions, it may be impractical to perform a detailed analysis on each item definition. The candidate item definitions represent an initial selection of item definitions that most likely include the matching item definitions, and which may be a fraction of the total number of item definitions in the item definition table 101. The identify candidate item definitions component, in one embodiment, uses a designated filter of each rule of the identified category to retrieve candidate item definitions based on the indexes. The match to item definitions component 203 then invokes the identify rule matches component 205 for each rule passing the candidate item definitions and receiving matching or potentially matching item definitions in return. When a matching item definition is identified, then the match to item definitions component returns that matching item definition without evaluating any other rule. If no matching item definition is found, then the match to item definitions component returns any potentially matching item definitions that were identified. As further described herein, the identify rule matches component applies a rule to the candidate item definitions to calculate similarity scores for the item definitions. The identify rule matches component 205 invokes the identify filter matches component 206 to calculate a similarity score for each candidate item definition for each filter. The identify filter matches component invokes the apply filter component 207 for each filter to calculate scores. The apply filter component invokes various scoring methods 208 designated by the filters to calculate a similarity score for an attribute. For example, there may be a scoring method for comparing attributes and generating a similarity score indicating the similarity. In one embodiment, the similarity scores vary between zero and one, with zero indicating very dissimilar and one indicating very similar.

Table 1 contains an example set of rules for the category of books in one embodiment.

TABLE 1

```
 1. <BOOKS resolution_threshold=".8">
 2.   <RULE name="isbn" search_size="100">
 3.     <FILTER>
 4.       <isbn method="wordmatch" criteria=".99" weight="1.00" present="true" valid="true"/>
 5.       <SIZE> 10 </SIZE>
 6.       <THRESHOLD> .99 </THRESHOLD>
 7.     </FILTER>
 8.     <FILTER>
 9.       <isbn method="wordmatch" criteria=".99" weight=".75" present="true" valid="true"/>
10.       <author method="edit_distance" criteria=".60" weight=".25" present="true" valid="true"/>
11.       <SIZE> 4 </SIZE>
12.       <THRESHOLD> .90 </THRESHOLD>
13.     </FILTER>
14.     <FILTER>
15.       <isbn method="wordmatch" criteria=".99" weight=".75" present="true" valid="true"/>
16.       <title method="edit_distance" criteria=".25" weight=".25" present="true" valid="true"/>
17.       <SIZE> 4 </SIZE>
18.       <THRESHOLD> .90 </THRESHOLD>
19.     </FILTER>
20.   </RULE>
21.   <RULE name="title" search_size="100">
22.     <FILTER>
23.       <title method="edit_distance" criteria=".25" weight=".5" present="true" valid="true"/>
24.       <product_type_id method="edit_distance" criteria=".99" weight=".50" present="true"
25. valid="true"/>
26.       <SIZE> 100 </SIZE>
27.       <THRESHOLD> .60 </THRESHOLD>
28.     </FILTER>
29.     <FILTER>
30.       <title method="edit_distance" criteria=".25" weight=".30" present="true" valid="true"/>
31.       <author method="edit_distance" criteria=".25" weight=".25" present="true" valid="true"/>
32.       <brand method="edit_distance" criteria=".5" weight=".25" present="true" valid="true"/>
33.       <book_format method="edit_distance" criteria=".5" weight=".20" present="true"
34. valid="true"/>
35.       <SIZE> 50 </SIZE>
36.       <THRESHOLD> .80 </THRESHOLD>
37.     </FILTER>
38.     <FILTER>
39.       <title method="edit_distance" criteria=".25" weight=".50" present="true" valid="true"/>
40.       <author method="edit_distance" criteria=".25" weight=".25" present="true" valid="true"/>
41.       <brand method="edit_distance" criteria=".5" weight=".25" present="true" valid="true"/>
42.       <SIZE> 50 </SIZE>
43.       <THRESHOLD> .90 </THRESHOLD>
44.     </FILTER>
45.   </RULE>
46.   <NEW>
47.     <isbn present="true" valid="true"/>
48.     <title present="true" valid="true"/>
49.     <brand present="true" valid="true"/>
50.     <UNIQUE>
51.       <ATTRIBUTE>isbn</ATTRIBUTE>
52.     </UNIQUE>
53.   </NEW>
54. </BOOKS>
```

The rules are specified using the extensible markup language ("XML"). In this example, the books category has a set of rules delimited by the books tags (lines 1 and 54). The category includes two rules (lines 2-20 and lines 21-45) along with a new item definition criterion (lines 46-53). The "books" tag (line 1) includes a "resolution_threshold" field that indicates the resolution queue threshold is 0.8 (i.e., a potentially matching threshold similarity score). That is, only those candidate item definitions whose similarity scores are above 0.8 are considered as potential matches. The first rule delineated by the "rule" tags (lines 2-20) contains three filters delineated by the "filter" tags (lines 3-7, 8-13, 14-19). The "rule" tag includes a "name" field and a "search_size" field (line 2). The name of the first rule is "ISBN," and the search size is 100. The search size for a rule indicates the number of the candidate item definitions that are identified from the item definition table. Each filter identifies one or more attributes that are to be used in calculating the similarity score. For example, the second filter (lines 8-13) indicates an attribute scoring technique for the ISBN attribute (line 9) and the author attribute (line 10) that is to be used in calculating the similarity score associated with that filter. The "criteria" field indicates that the resulting attribute similarity score has to be above 0.99, or else the filter similarity score is set to zero. The "weight" field indicates the weight of the attribute similarity score given to this attribute when calculating the filter similarity score. In this example, the ISBN attribute has a weight of 0.75, and the author attribute has a weight of 0.25. Thus, the filter similarity score is calculated by adding 0.75 of the ISBN similarity score and 0.25 of the author similarity score. The "present" field indicates that this attribute needs to be present in the item definition to calculate a similarity score. The "valid" field indicates that this attribute value needs to be valid in the item definition to calculate a similarity score. The "present" and "valid" fields are also used to test the integrity of the data of an item description. If an item description does not have an attribute that should be present or if its attribute value is invalid when it should be valid, then the item authority system identifies no item definitions as matching or potentially matching for that filter. The "threshold" tag of a filter indicates the minimum filter similarity score to be considered a match. If the filter similarity score is above the threshold similarity score, then the item definition is designated a match. An attribute similarity score is calculated using the scoring method specified by the attribute tags. For example, the ISBN attribute has a "method" field that identifies that the "wordmatch" method is to be used when generating the attribute similarity score. The wordmatch method removes punctuation, creates tokens, and compares the collection of tokens in the item description and item definition to identify the intersection of the two token sets. Those skilled in the art will recognize that many other techniques exist for comparing two text strings, including, for example, comparing the strings for an exact match ("exactmatch" method), measuring how many changes are necessary to modify one string to equal the second string ("editdistance" method), and determining the number, order, and identity of words that are detected ("order sequence" method). If the filter similarity score is above the resolution threshold similarity score, then the item definition is designated as potentially matching, assuming it has not already been designated as a match. The "size" tag of a filter indicates the maximum number of item definitions to be identified as having filter similarity scores above the threshold similarity score. The size tags and the search size fields thus place a limit on the number of item definitions that are checked by the matching engine. If a match is found for an item description, then any potentially matching item definitions can be disregarded. It is also possible that a single item definition may be indicated as a match or a potential match based on different filters. In such a case, the matching engine may set the similarity score for the item definition to the highest similarity score of a match, or, when a match is not found, to the highest similarity score of a potential match.

The new tag of the books rule indicates the criteria that an item description is to satisfy for it to be considered as representing a new item definition. In the example of Table 1, the ISBN, title, and brand tags should each be present in the item description and their attribute values should be valid. In addition, the value of the ISBN attribute of the item description should not be a duplicate of an ISBN that is already in the item definition table. If no matching or potential matching item definitions are found for an item description and the item description passes the new criteria, then the item authority system automatically adds a new item definition to the item definition table. Alternatively, the new item definition may be added only after confirmation by a system user.

Figure 3:
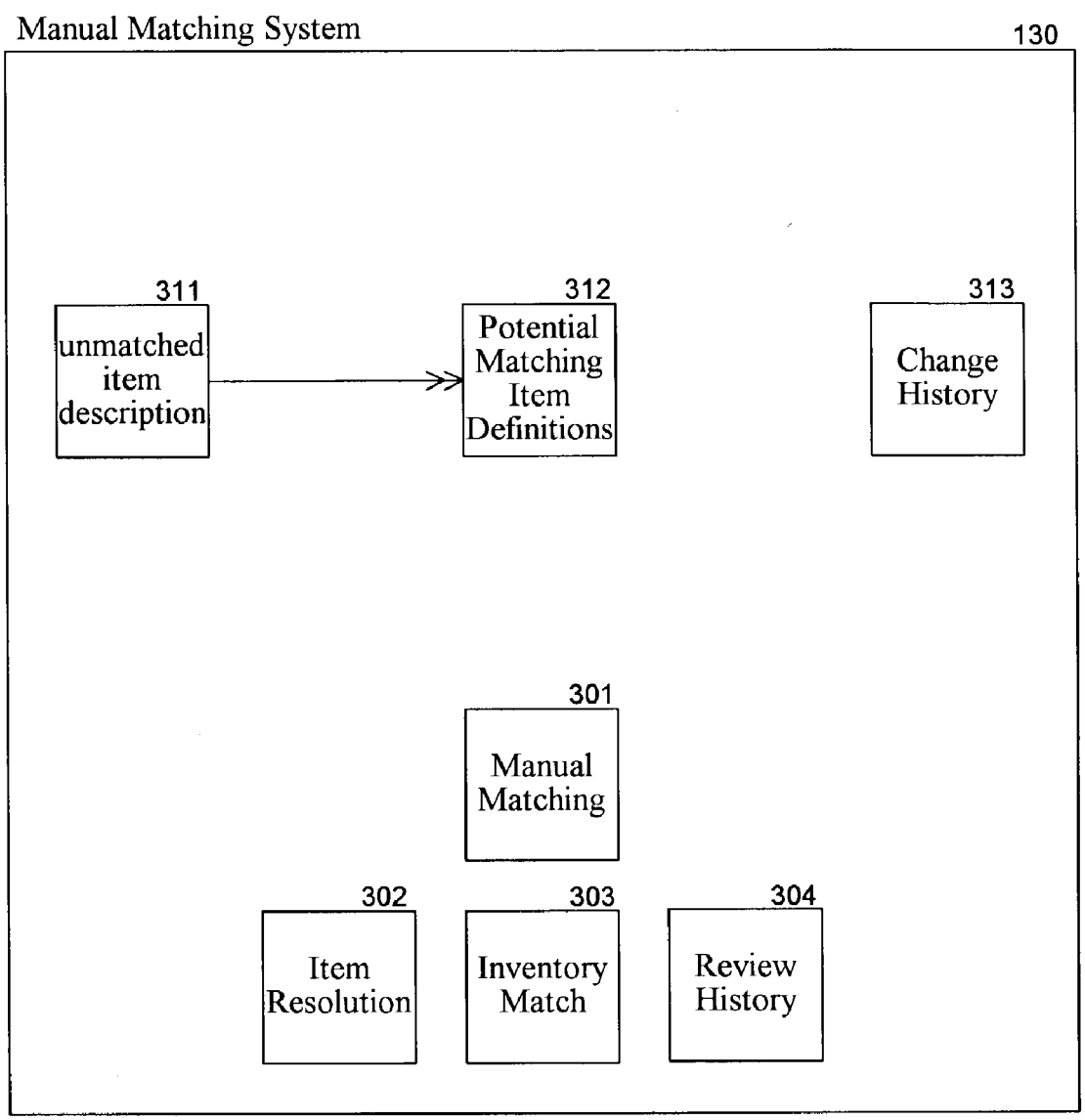
FIG. 3 is a block diagram illustrating the components of the manual matching subsystem in one embodiment.

FIG. 3 is a block diagram illustrating the components of the manual matching subsystem in one embodiment. The manual matching subsystem 130 includes components 301-304 that control the manual matching function, unmatched item description table 311, potential matching item definitions table 312, and change history table 313. The unmatched item description table 311, which corresponds to those items in the resolution queue, contains an entry for each item description that was not matched by the matching engine subsystem. The potential matching item definitions table 312 links each unmatched item description to each ambiguous and potential matching item definition identified by the matching engine subsystem 110. The change history table 313 contains an entry recording each change in the inventory table 102 or item definition table 101. The manual matching subsystem can be used to review and override the changes as appropriate. It will be appreciated that the definitive item definition can therefore change over time, as new information is added to the item definition or previously incorrect information in the item definition is corrected.

The manual matching component 301 provides a user interface through which a user can select the function of the item resolution component 302, the inventory match component 303, and the review history component 304. The item resolution component 302 allows a user to view the unmatched item descriptions whose status is resolution queue and match those item descriptions with one of the item definitions in the potentially matching item definition table. The inventory match component 303 allows a user to review item definitions and to match unmatched item descriptions of the inventory table (i.e., those item descriptions that have no potential matches) with item definitions. The review history component 304 allows a user to view and override changes that have been made to the inventory table and item definition table.

Figure 4:
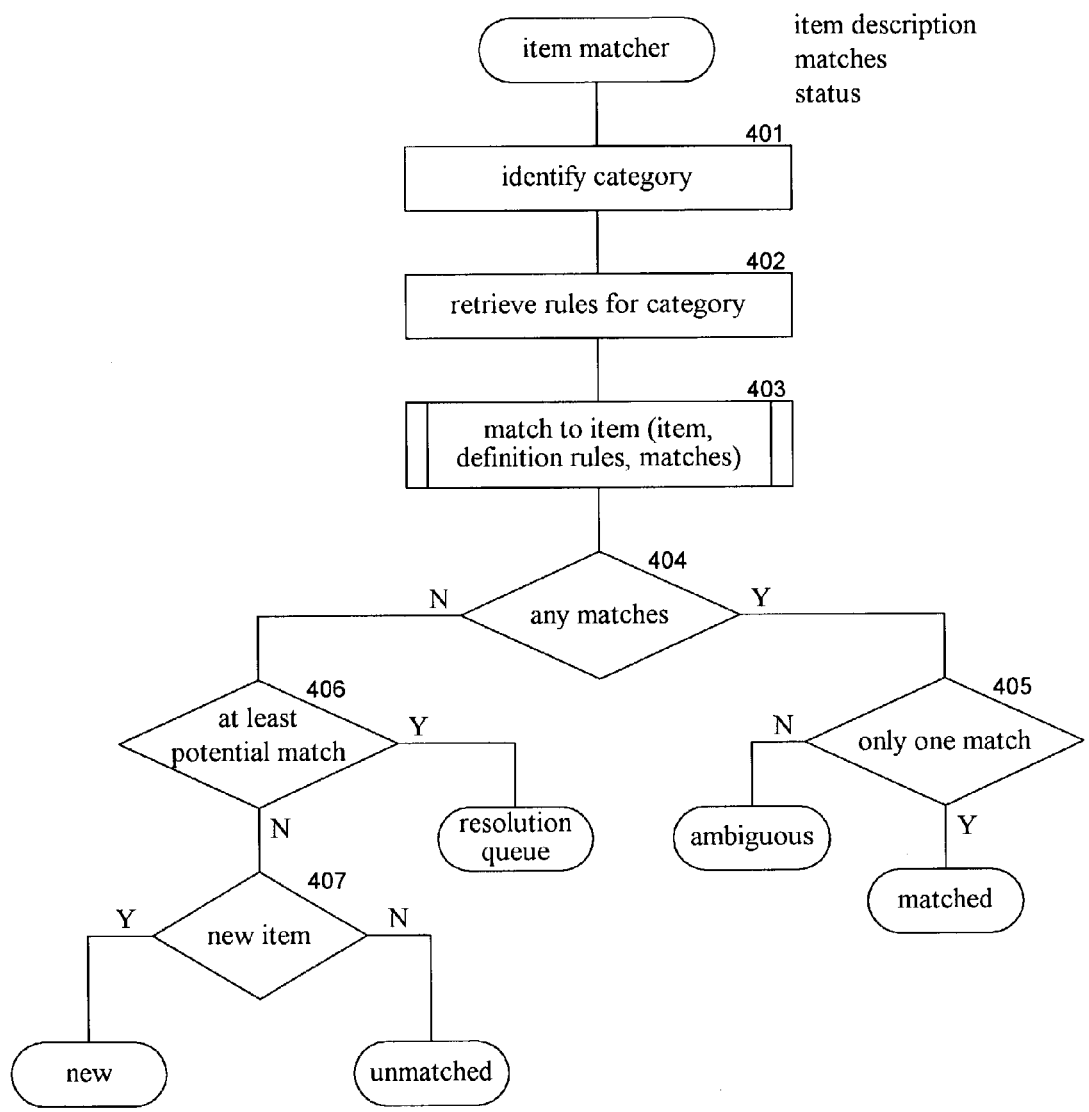
FIG. 4 is a flow diagram illustrating the processing of the item matcher component in one embodiment.

FIGS. 4-9 illustrate the flow diagrams of components of the matching engine subsystem in one embodiment. FIG. 4 is a flow diagram illustrating the processing of the item matcher component 201 in one embodiment. The item matcher component is passed an item description and returns a status for that item description along with an indication of any matching or potential matching item definitions and their similarity scores. In block 401, the component identifies the category of the item represented by the item description using the categorizer. In block 402, the component retrieves the rules for the identified category from the rules table. In block 403, the component invokes the match to item definitions component 203, passing the item description and the retrieved rules and receiving the identification of any matching and potentially matching item definitions in return. In blocks 404-407, the component determines the status for the item description. In decision block 404, if at least one item definition is designated as matching, then the component continues at block 405, else the component continues at block 406. In decision block 405, if only one item definition is designated as matching, then the item description matches only one item definition and the component returns a status of matched. If, however, more than one item definition is designated as matching, then the component returns the status of ambiguous. In decision block 406, if there is at least one item definition that is designated as potentially matching, then the component returns a status of resolution queue, else the component continues at block 407. In decision block 407, if the item description passed the "new" criteria, then the component returns a status of new, else the component returns a status of unmatched.

Figure 5:
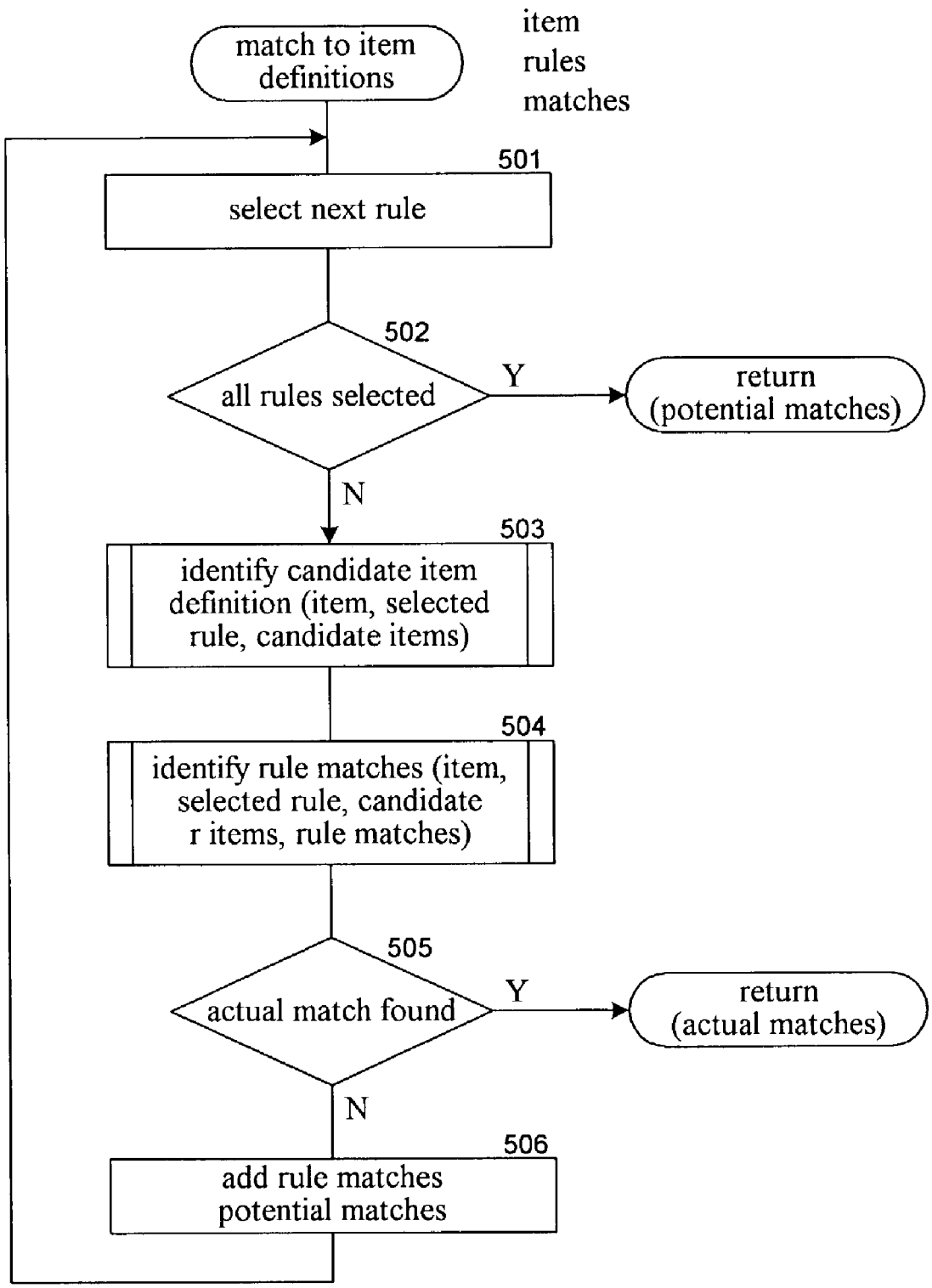
FIG. 5 is a flow diagram illustrating the processing of the match to item definitions component in one embodiment.

FIG. 5 is a flow diagram illustrating the processing of the match to item definitions component 203 in one embodiment. The component is passed an indication of an item description and a set of rules and returns an indication of the matching or potentially matching item definitions. The component loops, selecting each of the passed rules, identifying candidate item definitions for the rule, and identifying matching or potentially matching item definitions in accordance with the rule. When evaluating a rule, if the component identifies one or more item definitions that actually match, the component returns those item definitions without evaluating any additional rules. If, however, the component identifies no actual matches, then the component evaluates all the rules and returns any potentially matching item definitions that were identified. In block 501, the component selects the next rule. In decision block 502, if all the rules have already been selected without identifying an actual matching item definition, then the component returns any potentially matching item definitions, else the component continues at block 503. In block 503, the component invokes the identify candidate item definitions component and receives a list of the candidate item definitions for the selected rule in return. In block 504, the component invokes the identify rule matches component to identify those candidate item definitions that match or potentially match the selected rule. In decision block 505, if one or more matching item definitions are identified, then the component returns those matching item definitions, else the component continues at block 506. In block 506, the component adds any item definitions that potentially match the rule to the collection of item definitions that potentially match the item description. The component then loops to block 501 to select the next rule.

Figure 6:
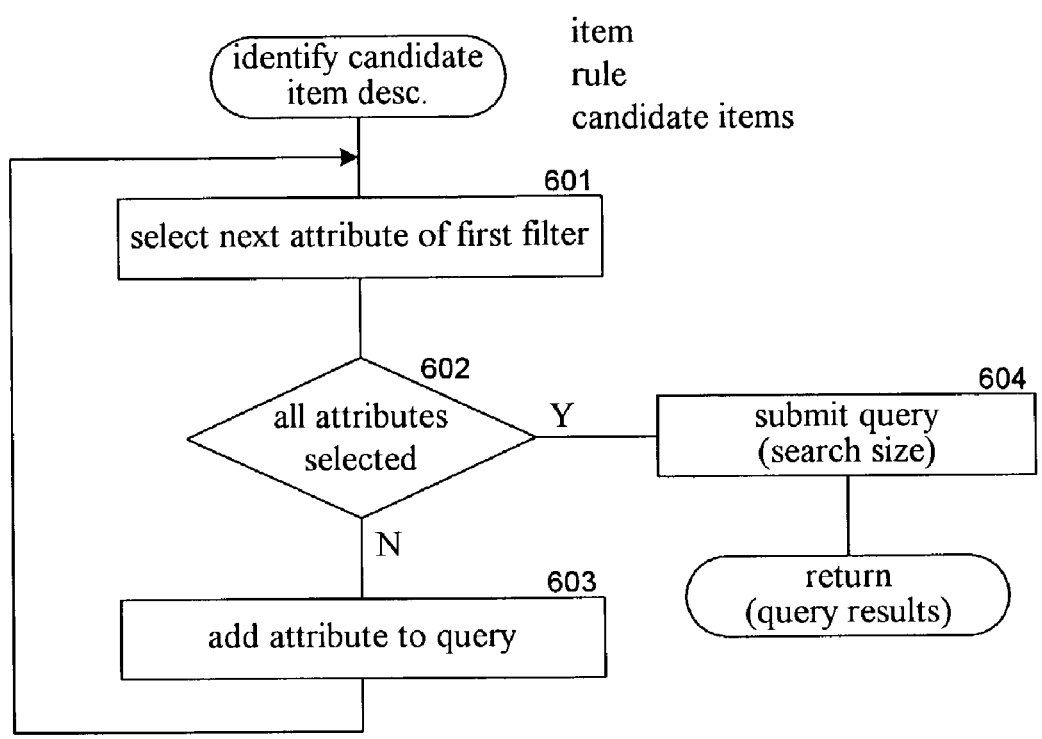
FIG. 6 is a flow diagram illustrating the processing of the identify candidate item definitions component in one embodiment.

FIG. 6 is a flow diagram illustrating the processing of the identify candidate item definitions component 204 in one embodiment. In this illustrated embodiment, the component identifies item definitions based on the attributes identified in the first filter of the rule. That is, the component identifies item definitions whose attribute values exactly match the attribute values in the item description for any or all of the attributes specified in the first filter of the rule. For example, the second rule of Table 1 (lines 21-45) has the attributes of title and product_type_id in its first filter. Thus, this component will retrieve all item definitions (up to the search size) that exactly match one or both of those attributes. One skilled in the art will appreciate that many different techniques may be used to identify candidate item descriptions. For example, candidate item descriptions may be identified based on closeness of their attribute values rather than on exact matches, or candidate item descriptions may be identified only if all attribute values are present. In blocks 601-603, the component loops, creating a query of the attribute values from the item description. It will be appreciated that any information retrieval system allowing recovery on fielded data is suitable for query execution. For example, the query may be a SQL query with a "where" clause for each attribute of the first filter of the rule. The query is then executed against the indexes. The query for the second rule in Table 1 might be SELECT item_definition_key
    WHERE title="Harry Potter"
    WHERE product_type_id="paperback"

In block 601, the component selects the next attribute of the first filter of the rule. In decision block 602, if all the attributes of the first filter have already been selected, then the component continues at block 604, else the component continues at block 603. In block 603, the component adds a "where" statement to the query indicating the attribute and the attribute value of the item description. The component then loops to block 601 to select the next attribute. In block 604, the component executes the query limited to the search size number of results specified by the rule. In one embodiment, the query is executed against the indexes generated by the matching engine. The component then returns the query results as the candidate item definitions.

Figure 7:
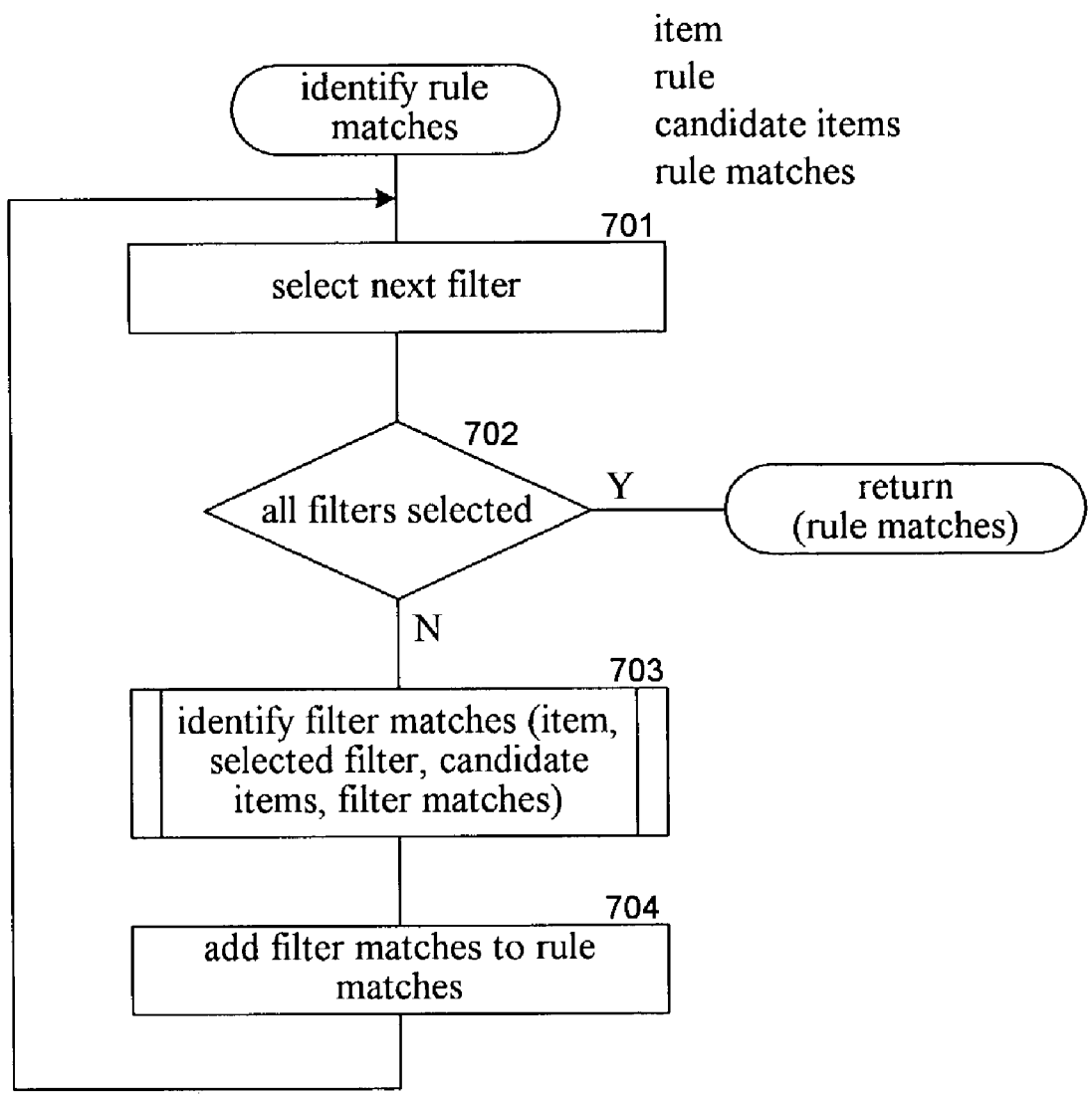
FIG. 7 is a flow diagram illustrating the processing of the identify rule matches component in one embodiment.

FIG. 7 is a flow diagram illustrating the processing of the identify rule matches component 205 in one embodiment. This component is passed the item description, a rule, and candidate item definitions and returns an indication of those item definitions that match or potentially match the item description. In block 701, the component selects the next filter of the rule. In one embodiment, the component may skip the first filter of the rule when the first filter is used to identify the candidate item definitions. In decision block 702, if all the filters have already been selected, then the component returns an indication of the matching and potentially matching item definitions, else the component continues at block 703. In block 703, the component invokes the identify filter matches component for the selected filter and receives an indication of the item definitions that match or potentially match based on the filter. In block 704, the component adds the returned item definitions that match or potentially match the filter to the collection of item definitions that match or potentially match for the rule and then loops to block 701 to select the next filter.

Figure 8:
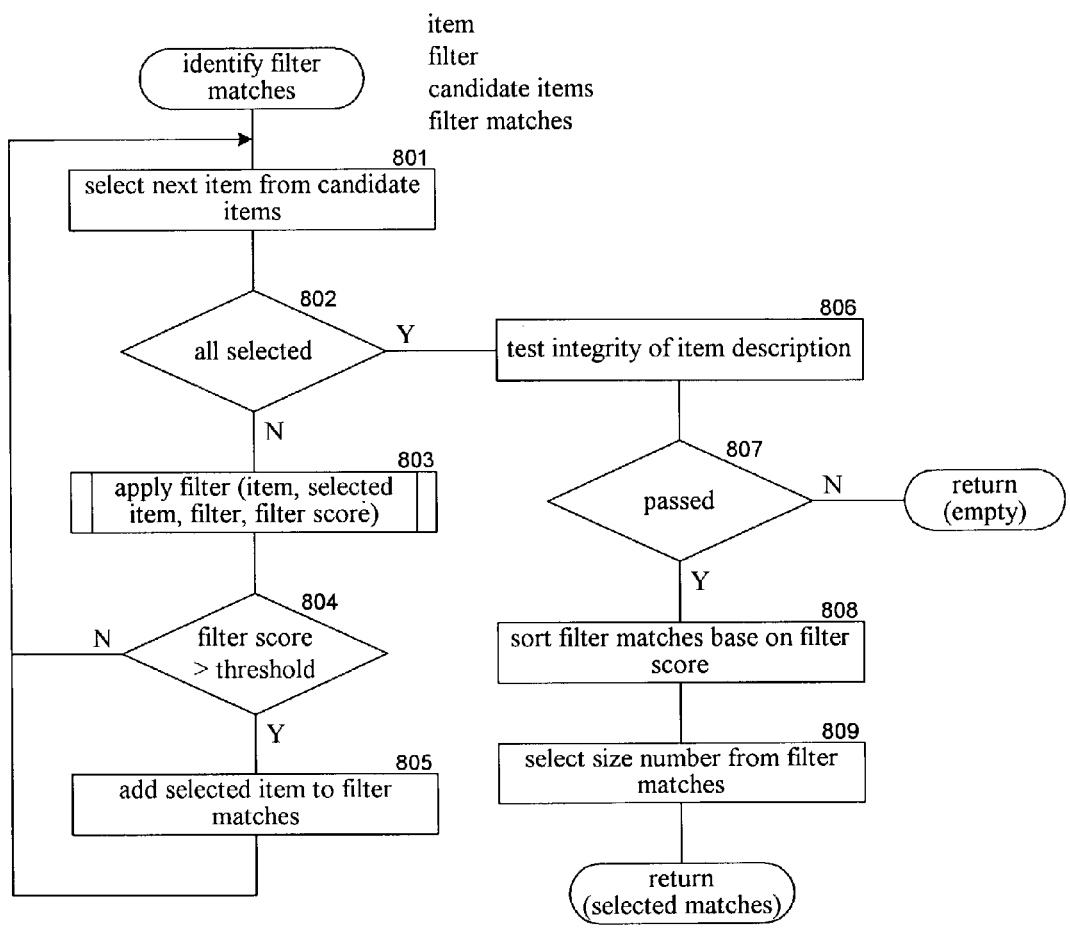
FIG. 8 is a flow diagram illustrating the processing of the identify filter matches component in one embodiment.

FIG. 8 is a flow diagram illustrating the processing of the identify filter matches component 206 in one embodiment. The component is passed an item description, a filter, and an indication of the candidate item definitions and returns a list of those candidate item definitions that match or potentially match and their similarity scores. The component also tests the integrity of the item description, and, if it does not pass the test, the component discards any matching or potentially matching item definitions. In blocks 801-805, the component loops, selecting each candidate item definition and applying the filter to it. In block 801, the component selects the next item definition from the candidate item definitions. In decision block 802, if all the candidate item definitions have already been selected, then the component continues at block 806, else the component continues at block 803. In block 803, the component invokes the apply filter component to calculate the similarity score for the selected item definition. In decision block 804, if the similarity score is above the threshold similarity score for that filter or above the resolution queue threshold similarity score for the category, then the component continues at block 805, else the component loops to select the next candidate item definition. In block 805, the component adds the selected item definition to the list of matching and potentially matching item definitions as appropriate and then loops to block 801 to select the next candidate item definition. In block 806, the component tests the integrity of the data of the item description as it relates to applying the passed filter. In one embodiment, the integrity test is defined by the present and valid fields of the attributes specified by the passed filter. If the present field is true for an attribute but the item description does not include that attribute or if the valid field is true for an attribute but the value for that attribute in the item description is not valid, then the item description fails the integrity test. One skilled in the art will appreciate that other integrity testing can be performed and that the testing could be performed before calculating the similarity scores. In decision block 807, if the item description passes the integrity test, the component continues at block 808, else the component returns an indication that none of the candidate item definitions match the item description. In block 808, the component sorts the list of matching or potentially matching item definitions based on similarity score. In block 809, the component selects matching and potentially matching item definitions with the highest similarity scores up to the size number (indicated by the size tag in the filter) and returns the selected item definitions.

Figure 9:
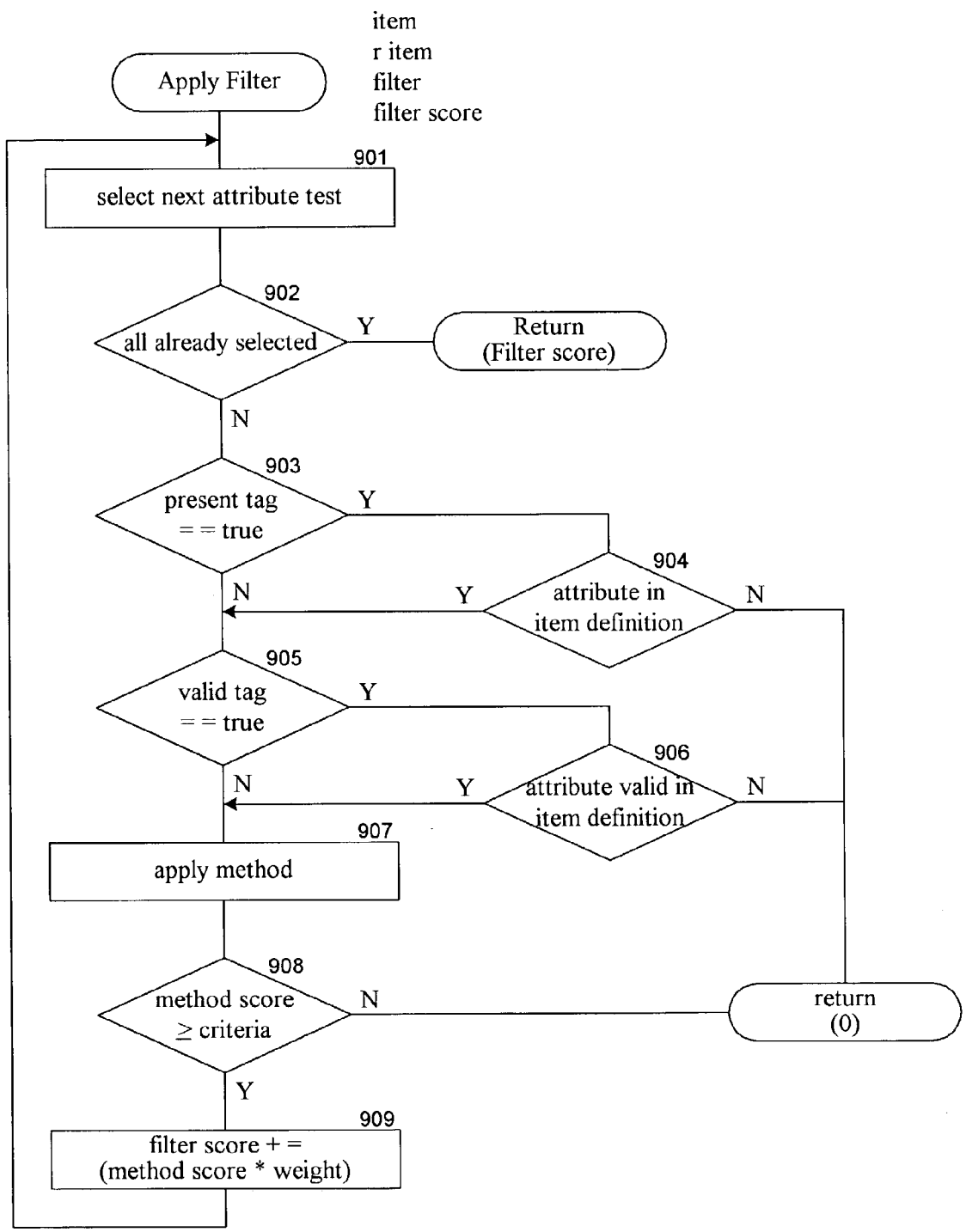
FIG. 9 is a flow diagram illustrating the processing of the apply filter component in one embodiment.

FIG. 9 is a flow diagram illustrating the processing of the apply filter component 207 in one embodiment. In blocks 901-909, the component loops, selecting each attribute of the filter and calculating an attribute similarity score for that attribute and calculating a running filter similarity score for the filter. In block 901, the component selects the next attribute of the filter. In decision block 902, if all the attributes of the filter have already been selected, then the component returns the filter similarity score, else the component continues at block 903. In decision block 903, if the "present" field of the selected attribute is true, then the component continues at block 904, else the component continues at block 905. In decision block 904, if the attribute is present in the item definition, then the component continues at block 905, else the component returns a filter similarity score of zero. In decision block 905, if the "valid" field of the selected attribute is true, then the component continues at block 906, else the component continues at block 907. In decision block 906, if the attribute value is valid in the item definition, then the component continues at block 907, else the component returns a filter similarity score of zero. In block 907, the component applies the scoring method designated by the selected attribute to generate an attribute similarity score. In decision block 908, if the attribute similarity score is above the criteria value for that attribute, then the component continues at block 909, else the component returns a filter similarity score of zero. In block 909, the component adds the weighted attribute similarity score to the running filter similarity score and then loops to block 901 to select the next attribute.

FIGS. 10-17 are display pages illustrating the user interface of the manual matching subsystem in one embodiment. The manual matching subsystem includes an item resolution component, a match component, and a review component. The item resolution component allows a user to view item descriptions placed in the resolution queue by the matching engine. The item resolution component allows the user to match the unmatched item descriptions to one of the matching or potentially matching item definitions identified by the matching engine or to reject any of the identified item definitions as matches. The match component allows the user to search for and merge item definitions and to locate unmatched item descriptions that may match an item definition. The match component also allows the user to locate an unmatched item description, to search for potential matching item definitions, and to match an unmatched item description to an item definition. The manual matching subsystem may use the same rules as the matching engine and share components of the matching engine for calculating similarity scores. The manual matching subsystem may also allow a user to set a resolution similarity score for the resolution queue. The manual matching subsystem effectively discards any item definitions whose similarity score is not above the resolution similarity score. For example, if the resolution similarity score is 0.8, and the resolution queue contains an item description with three potentially matching item definitions with similarity scores of 0.5, 0.75, and 0.85, then the subsystem will discard the two item definitions with scores of 0.5 and 0.75 and report only the item definition with the score of 0.85. In this way, the user can effectively filter out item definitions that, based on the user's experience, have similarity scores that are too low to indicate a match.

Figure 10:
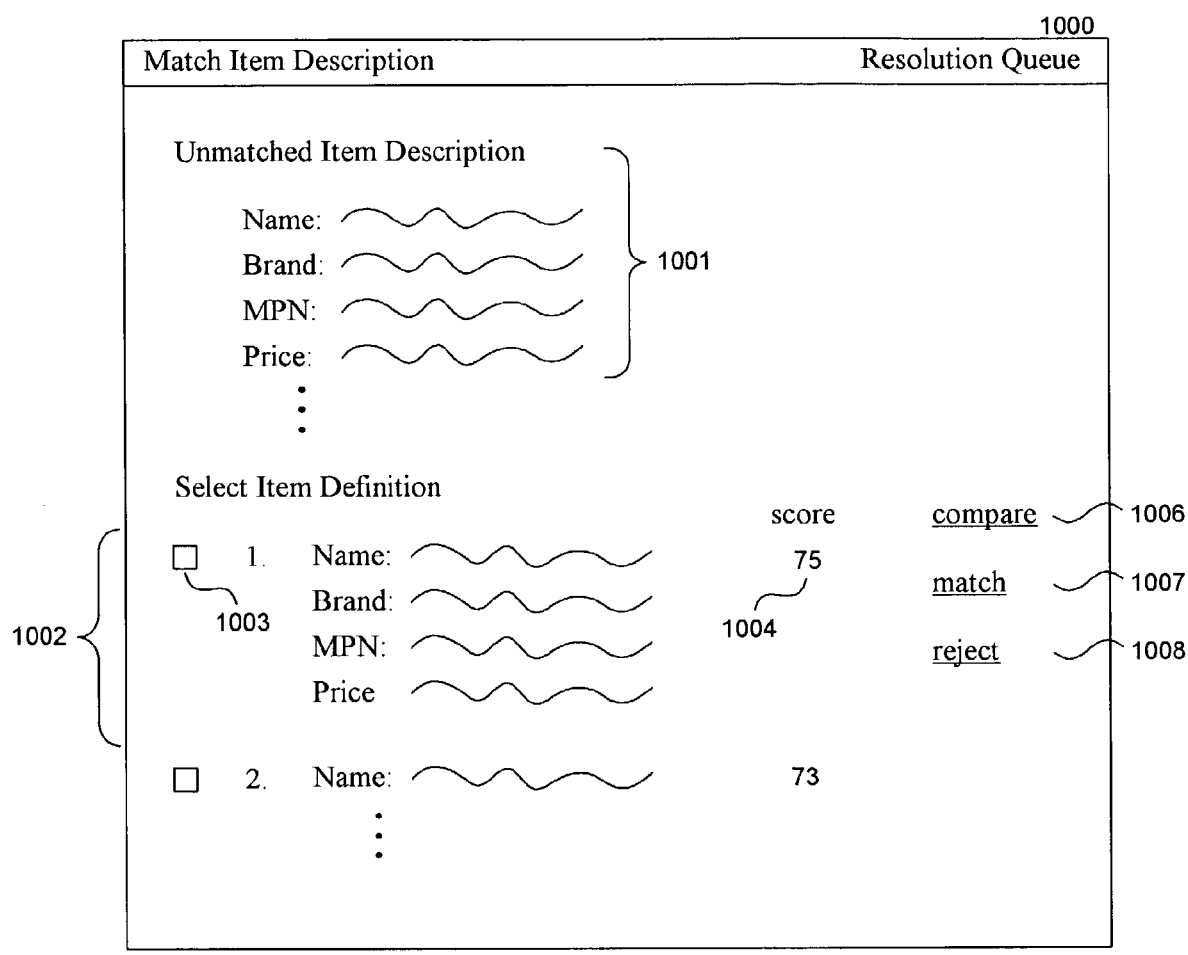
FIG. 10 is a display page illustrating the processing of unmatched item descriptions of the resolution queue in one embodiment.

FIG. 10 is a display page illustrating the processing of unmatched item descriptions of the resolution queue in one embodiment. Display page 1000 includes attribute values 1001 for an unmatched item description of the resolution queue along with the attribute values 1002 of the matching and potentially matching item definitions identified by the matching engine. Each item definition includes a checkbox 1003 for selecting that item definition. The item definitions may also include the similarity scores 1004 calculated by the matching engine. A user may select the "compare" link 1006 to view a more detailed comparison of the unmatched item description and the selected item definitions. The user may select the "match" link 1007 to match a selected item definition to the unmatched item description. The user may select the "reject" link 1008 to indicate that none of the item definitions match and to remove the unmatched item description from the resolution queue. The item resolution component may allow the user to browse through and select the unmatched item descriptions in the resolution queue.

Figure 11:
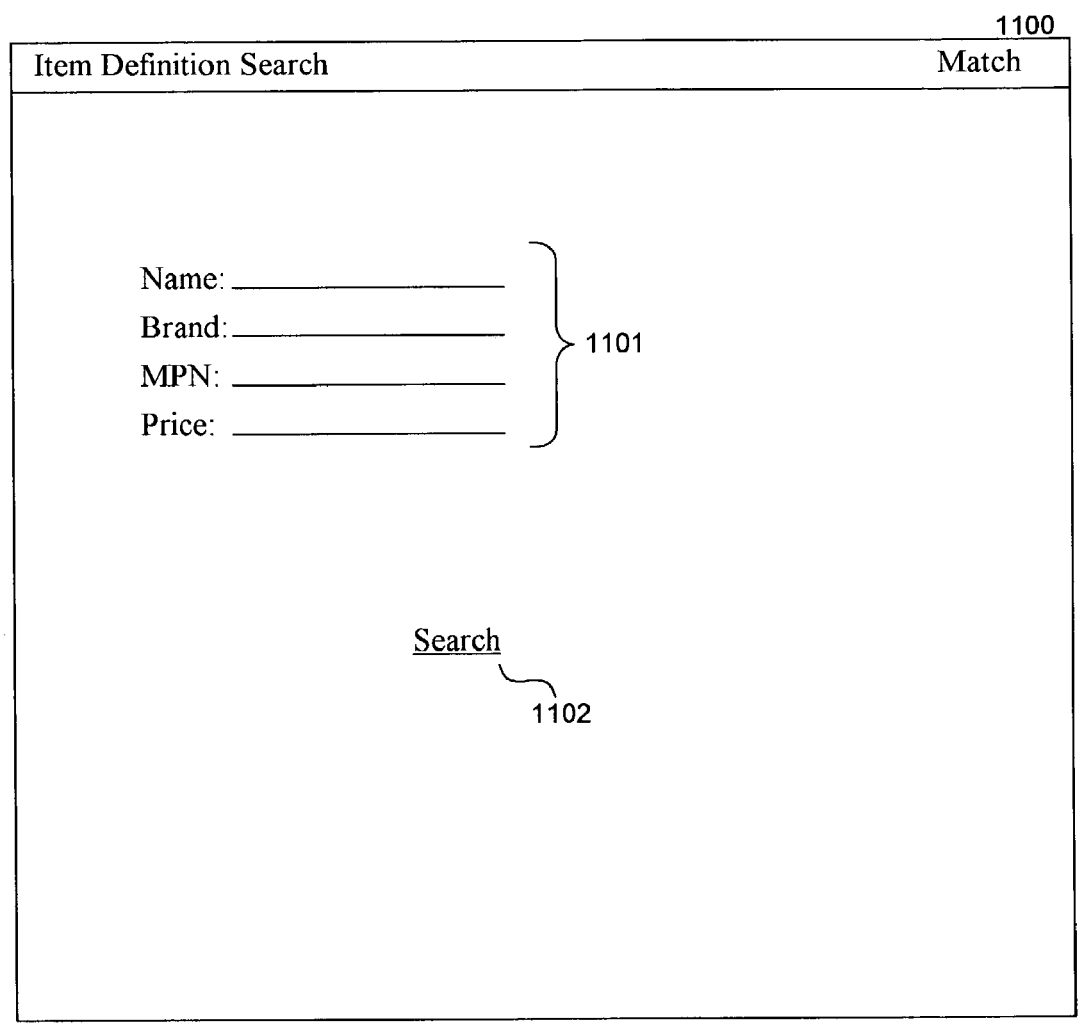
FIG. 11 is a display page illustrating the process of searching for an item definition using the match component.

FIG. 11 is a display page illustrating the process of searching for an item definition using the match component. Display page 1100 includes a search specification area 1101. The user enters the search specification in the search specification area and then selects the "search" link 1102 to search for item definitions that match the search specification. This search may be performed against the indexes generated by the matching engine or the item definition table itself, and may be use any of the scoring methods used to match attributes.

Figure 12:
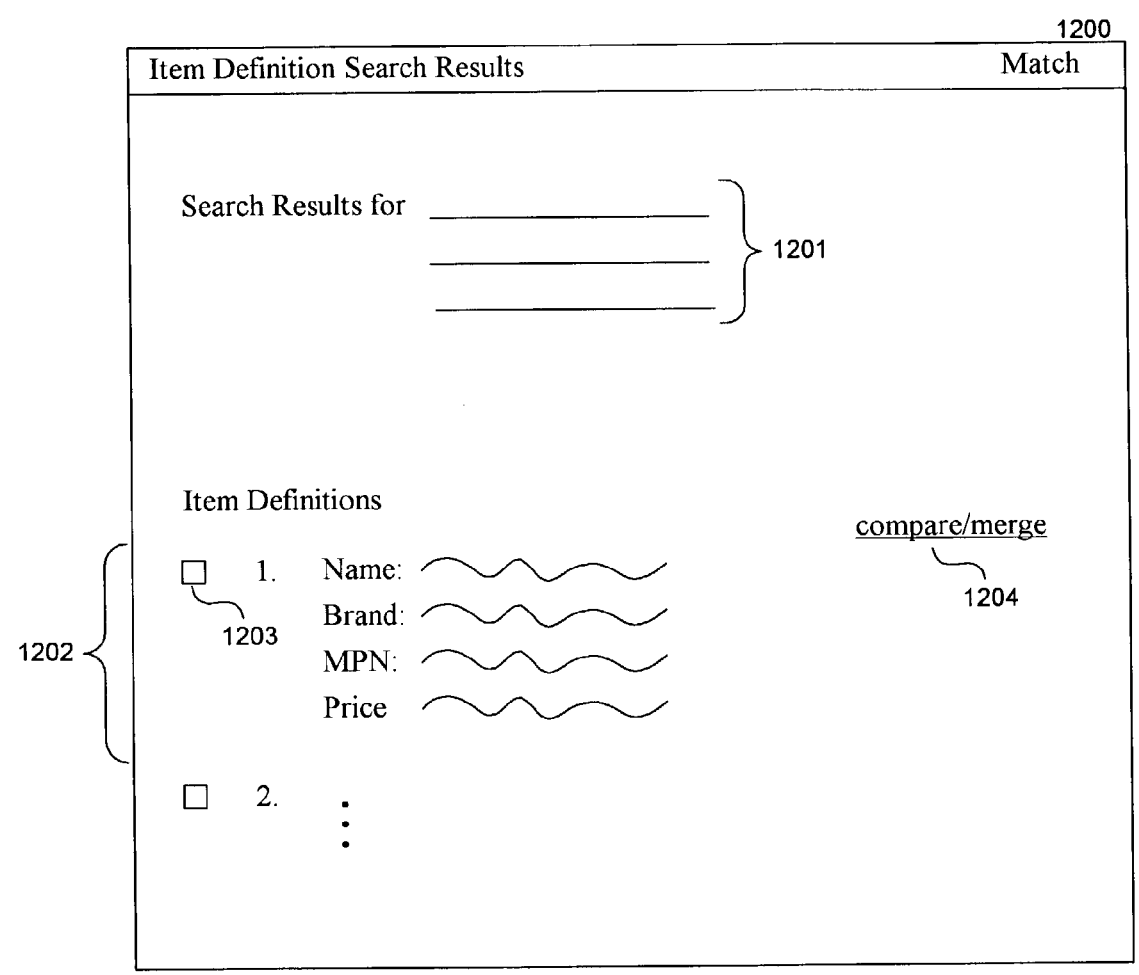
FIG. 12 is a display page illustrating item definition search results in one embodiment.

FIG. 12 is a display page illustrating item definition search results in one embodiment. Display page 1200 includes search specification area 1201 for displaying the original search and attribute values 1202 for each item definition that matches the search specification. Each item definition also includes a checkbox 1203. A user can view a more detailed comparison of the item definitions and possibly merge item definitions by selecting checkboxes and then selecting the "compare/merge" link 1204.

Figure 13:
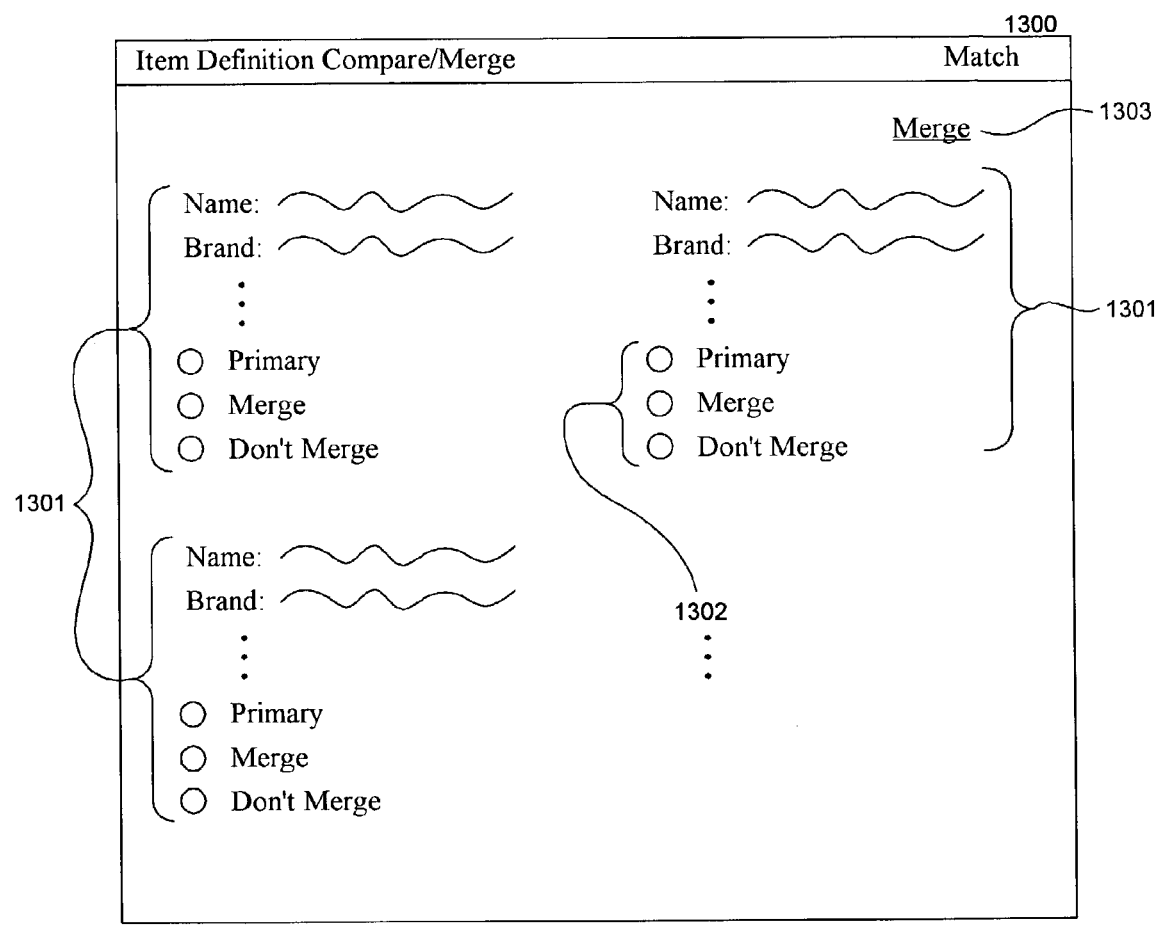
FIG. 13 is a display page illustrating the comparison of item definitions prior to merging.

FIG. 13 is a display page illustrating the comparison of item definitions prior to merging. Display page 1300 includes attribute values 1301 for the item definitions that have been selected for comparison. Each item definition includes radio buttons 1302 for designating whether the item definition is to be the primary or surviving item definition of the merge, is to be merged with the primary item definition, or is not to be merged into the primary item definition. After selecting the radio buttons, the user selects the "merge" link 1303 to perform the merge as indicated. In one embodiment, when item definitions are merged, the item descriptions that were matched to the merged item definitions are set to match the primary item definition and the merged item definitions are removed from the item definition table, leaving only the primary item definition. In another embodiment, a user may select which attributes from the merged item definitions are to be added to the primary item definition and which attributes are to be discarded from the merged item definitions.

Figure 14:
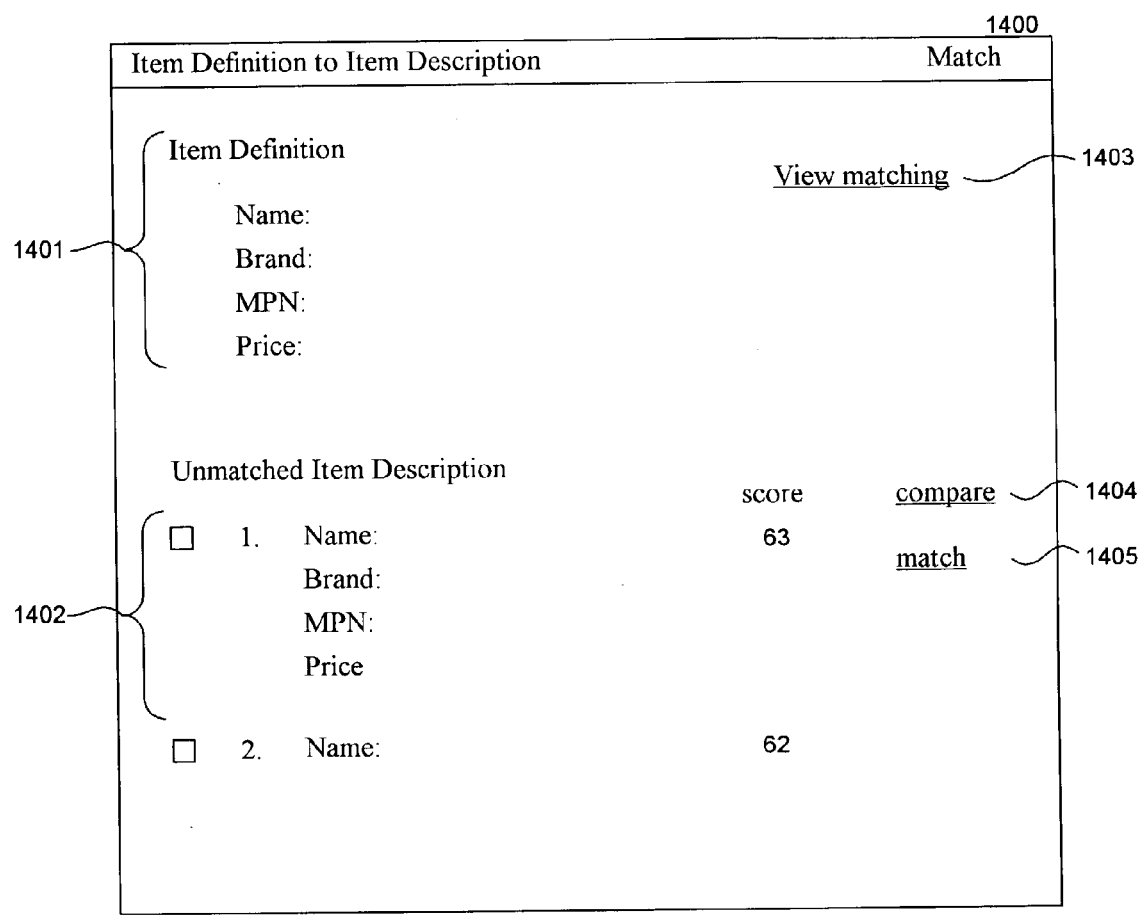
FIG. 14 is a display page illustrating matching of unmatched item descriptions to an item definition in one embodiment.

FIG. 14 is a display page illustrating matching of unmatched item descriptions to an item definition in one embodiment. Display page 1400 may be displayed after the user has selected an item definition and requested to view all unmatched item descriptions that may match this item definition. The display page includes attribute values 1401 of the item definition and attribute values 1402 of the unmatched item descriptions ordered according to their similarity score. The similarity scores may be calculated using the rules as described above. A user may view item descriptions that match the item definition by selecting the "view matching" link 1403. A user may find viewing the matching item description helpful in deciding whether an unmatched item description should be matched. The user can view a more detailed comparison of the item definition to the unmatched item descriptions by selecting unmatched item descriptions of interest and selecting the "compare" link 1404. The user may also match unmatched item descriptions to the item definition by selecting the unmatched item descriptions and selecting the "match" link 1405.

FIG. 15 is a display page illustrating entry of a search specification for unmatched item descriptions in one embodiment. Display page 1500 includes search specification area 1501 for entry of the search specification. After entry, the user selects the "search" link 1502 to perform the search.

Figure 16:
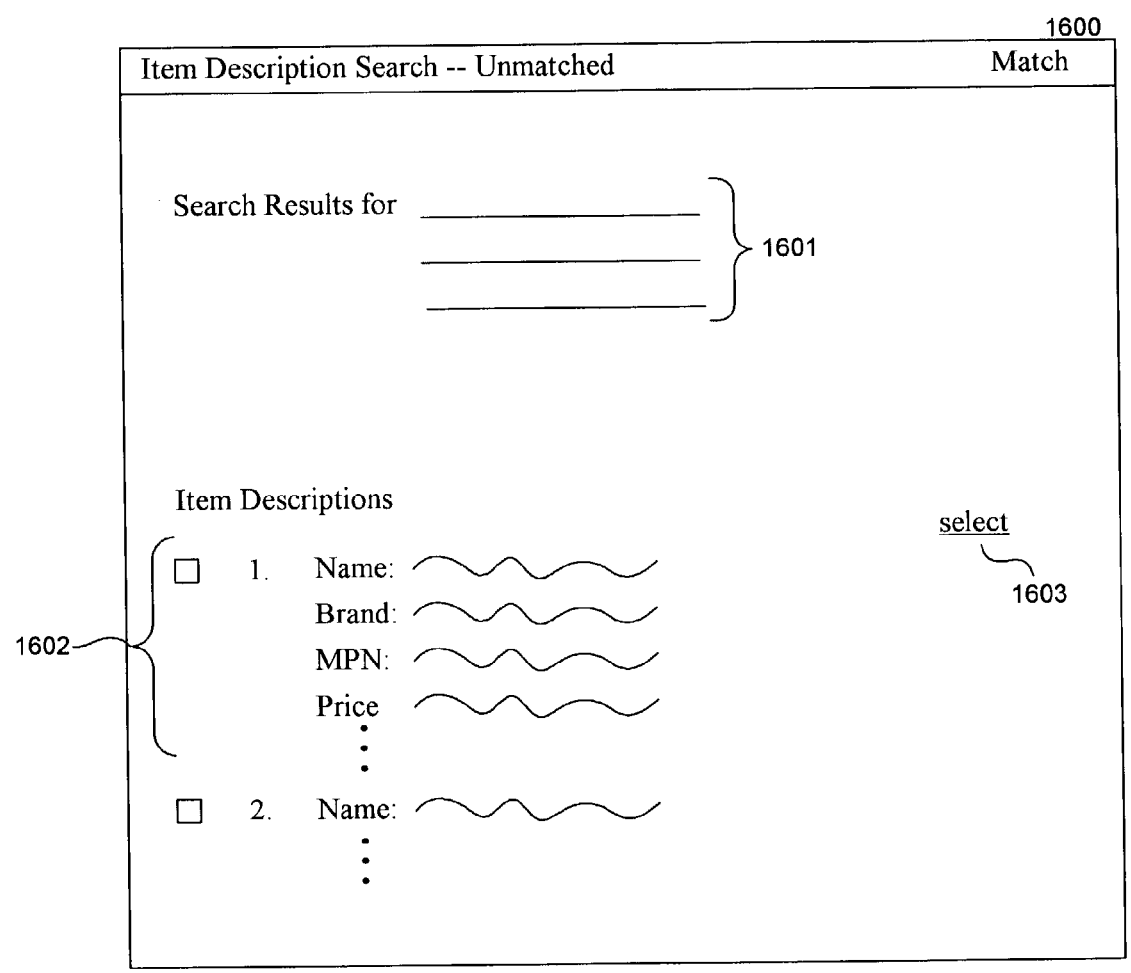
FIG. 16 is a display page illustrating the results of a search for unmatched item descriptions in one embodiment.

FIG. 16 is a display page illustrating the results of a search for unmatched item descriptions in one embodiment. Display page 1600 includes the search specification area 1601 for displaying the original search and attribute values 1602 for the unmatched item descriptions that satisfy the search specification. The user can select the checkboxes of the item descriptions of interest and then the "select" link 1603 to view additional information about the item descriptions such as possible matching item definitions.

Figure 17:
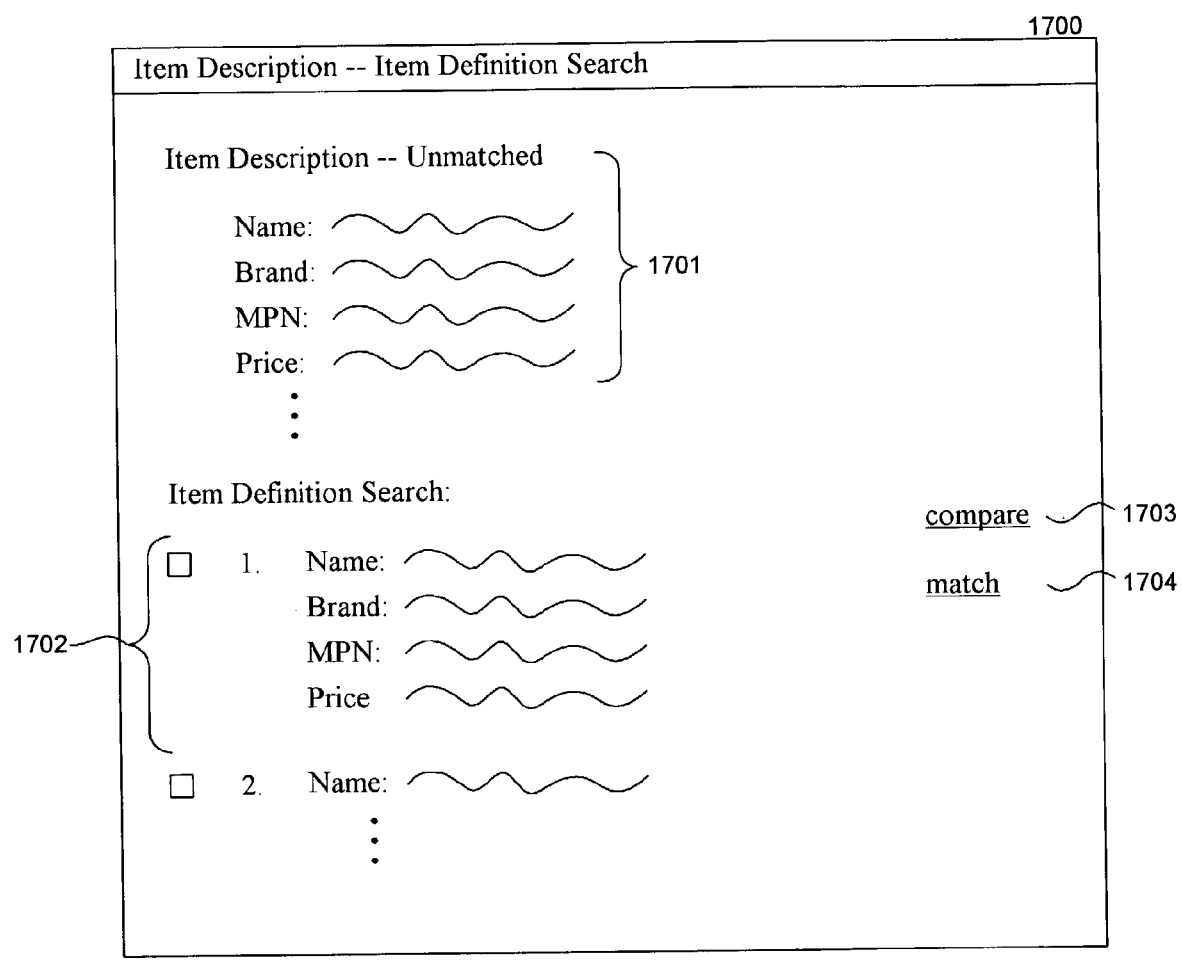
FIG. 17 is a display page illustrating possible match item definitions for an unmatched item description.

FIG. 17 is a display page illustrating possible match item definitions for an unmatched item description. Display page 1700 includes item description area 1701 and attribute values 1702 for possible matching item definitions. The possible matching item definition may be identified using the rules as described above. A user can select the "compare" link 1703 to compare the selected item definitions to the unmatched item description. The comparison may include the similarity scores for the item definitions. A user may select the "match" link 1704 to match a selected item definition to the item description.

From the foregoing, it will be appreciated that although embodiments of the item authority system have been described for purposes of illustration, various modifications may be made without deviating from the spirit and scope of the invention. For example, the manual matching system may be modified to allow the user to specify new item definitions that are based on a received and unmatched item description. Accordingly, the invention is not limited except by the appended claims.

We claim:

1. A method in a computer system for identifying an item definition that matches an item description, the item definition and item description having attributes with values, the method comprising:

providing one or more rules that specify how to generate a similarity score based on similarity between the values of the attributes of an item definition and an item description;

for each of a plurality of item definitions, generating a similarity score for the item definition and the item description in accordance with the rules, wherein a score is assigned to the attributes of the item definition and the item description, and scores of the attributes are aggregated to derive the similarity score; and selecting the item definition whose generated similarity score indicates it is most similar to the item description as the matching item definition.

2. The method of claim 1 wherein a rule indicates how to generate a similarity score based on similarity of the values of multiple attributes.

3. The method of claim 1 wherein a rule includes one or more filters, each filter specifying how to generate a filter similarity score, wherein the similarity score for an item definition is the filter similarity score that indicates the item definition is most similar to the item description.

4. The method of claim 3 wherein a filter specifies an attribute scoring technique for one or more attributes that generates an attribute similarity score for that attribute and specifies how to combine the generated attribute similarity scores to generate a filter similarity score.

5. The method of claim 4 wherein an attribute scoring technique specifies a minimum score for the attribute, wherein, when the minimum score is not met, the filter similarity score for the filter is set to indicate no similarity.

6. The method of claim 4 wherein an attribute scoring technique specifies that, when the attribute is not present in either the item definition or the item description, the filter similarity score is set to indicate no similarity.

7. The method of claim 4 wherein an attribute scoring technique specifies that, when a value for the attribute is not valid in either the item definition or the item description, the filter similarity score is set to indicate no similarity.

8. The method of claim 4 wherein the attribute scoring technique specifies weighting to be used when combining the attribute similarity score for that attribute with the attribute similarity score of other attributes.

9. The method of claim 3 wherein a filter indicates a threshold filter similarity score wherein, when the filter similarity score generated in accordance with the filter meets the threshold filter similarity score, the item definition matches the item description.

10. The method of claim 9 wherein a filter indicates a maximum number of item definitions for which filter similarity scores that exceed the threshold filter similarity score are to be identified.

11. The method of claim 1 wherein a rule includes one or more filters, each filter specifying how to identify item definitions that are similar to the item description.

12. The method of claim 11 wherein a filter specifies a threshold filter similarity score that indicates the threshold similarity score for that filter needed for a match.

13. The method of claim 11 wherein a filter specifies a maximum number of item definitions that are to be identified as matching based on the filter.

14. The method of claim 1 including providing a potentially matching threshold similarity score for an item definition to be considered as potentially matching the item description.

15. The method of claim 1 wherein when more than one item definition has a similarity score that indicates it is a match, identifying those item definitions as ambiguously matching item definitions.

16. The method of claim 1 including:
generating indexes for attributes, each index for an attribute mapping values of that attribute to item definitions; and
using the indexes to identify candidate item definitions.

17. The method of claim 16 wherein a rule specifies a criterion for identifying the candidate item definitions.

18. A method in a computer system for determining whether an item description matches an item definition in a collection of item definitions, the method comprising:
providing one or more rules for use in determining whether the item description matches an item definition, each rule having one or more filters specifying a scoring metric for calculating a similarity score indicating similarity between an item description and an item definition, wherein a score is assigned to the attributes of the item definition and the item description, and scores of the attributes are aggregated to derive the similarity score;
selecting candidate item definitions that may match the item description;
for each rule,
for each filter in the rule,
calculating similarity scores for candidate item definitions in accordance with the scoring metric of the filter; and
selecting based on the calculated similarity scores the candidate item definition that most closely matches the item description as the matching item definition.

19. A computer system for matching item descriptions to item definitions, comprising:
a matching engine subsystem that identifies candidate item definitions for an item description, that calculates similarity scores for candidate item definitions, and that indicates candidate item definitions that match or potentially match an item description based on the similarity scores, wherein a score is assigned to the attributes of the item definition and the item description, and scores of the attributes are aggregated to derive the similarity score; and
a manual matching subsystem that allows a user to designate a potentially matching item definition as matching an item description.

20. The computer system of claim 19 wherein when only one candidate item definition is indicated as matching the item description, designating that candidate item definition as matching the item description.

21. The computer system of claim 19 wherein the manual matching subsystem allows the user to designate one of two or more matching item definitions as matching the item description.

22. The computer system of claim 19 wherein the matching engine subsystem uses rules for calculating the similarity scores.

23. The computer system of claim 22 wherein a rule includes scoring metrics for calculating similarity scores based on different attributes of an item description and item definitions.

24. The computer system of claim 23 wherein a scoring metric specifies how to combine similarity scores for different attributes.

25. The computer system of claim 24 wherein the similarity scores of attributes are assigned weights for their combining.

26. The computer system of claim 19 wherein the matching engine subsystem uses indexes of attributes into item definitions to identify candidate item definitions.

27. The computer system of claim 19 wherein an item description specifies a product that a merchant has in inventory and an item definition corresponds to an entry in a catalog of products.

28. A computer-readable medium containing instructions for identifying an item definition that matches an item description, by a method comprising:
providing one or more rules that specify how to generate a similarity score based on similarity between the item definition and an item description;
for each of a plurality of item definitions, generating a similarity score for the item definition and the item description in accordance with the rules, wherein a score is assigned to the attributes of the item definition and the item description, and scores of the attributes are aggregated to derive the similarity score; and
selecting the item definition whose generated similarity score indicates it is most similar to the item description as the matching item definition.

29. The computer-readable medium of claim 28 wherein an item definition and an item description have attributes with values and wherein a rule indicates how to generate a similarity score based on similarity between the values of the attributes of the item definition and the item description.

30. The computer-readable medium of claim 29 wherein a rule indicates how to generate a similarity score based on similarity of the values of multiple attributes.

31. The computer-readable medium of claim 28 wherein a rule includes one or more filters, each filter specifying how to generate a filter similarity score, wherein the similarity score for an item definition is the filter similarity score that indicates the item definition is most similar to the item description.

32. The computer-readable medium of claim 31 wherein an item definition and an item description have attributes with values and wherein a filter specifies an attribute scoring technique for one or more attributes that generates an attribute similarity score for that attribute and specifies how to combine the generated attribute similarity scores to generate a filter similarity score.

33. The computer-readable medium of claim 32 wherein an attribute scoring technique specifies a minimum score for the attribute, wherein, when the minimum score is not met, the filter similarity score for the filter is set to indicate no similarity.

34. The computer-readable medium of claim 32 wherein an attribute scoring technique specifies that, when the attribute is not present in either the item definition or the item description, the filter similarity score is set to indicate no similarity.

35. The computer-readable medium of claim 32 wherein an attribute scoring technique specifies that, when a value for the attribute is not valid in either the item definition or the item description, the filter similarity score is set to indicate no similarity.

36. The computer-readable medium of claim 32 wherein the attribute scoring technique specifies weighting to be used when combining the attribute similarity score for that attribute with the attribute similarity score of other attributes.

37. The computer-readable medium of claim 31 wherein a filter indicates a threshold filter similarity score wherein, when the filter similarity score generated in accordance with the filter meets the threshold filter similarity score, the item definition matches the item description.

38. The computer-readable medium of claim 37 wherein a filter indicates a maximum number of item definitions for which filter similarity scores that exceed the threshold filter similarity score are to be identified.

39. The computer-readable medium of claim 28 wherein a rule includes one or more filters, each filter specifying how to identify item definitions that are similar to the item description.

40. The computer-readable medium of claim 39 wherein a filter specifies a threshold filter similarity score that indicates the threshold similarity score for that filter needed for a match.

41. The computer-readable medium of claim 39 wherein a filter specifies a maximum number of item definitions that are to be identified as matching based on the filter.

42. The computer-readable medium of claim 28 including providing a potentially matching threshold similarity score for an item definition to be considered as potentially matching the item description.

43. The computer-readable medium of claim 28 wherein when more than one item definition has a similarity score that indicates it is a match, identifying those item definitions as ambiguously matching item definitions.

44. The computer-readable medium of claim 28 wherein an item definition and an item description have attributes with values and including:
generating indexes for attributes, each index for an attribute mapping values of that attribute to item definitions; and
using the indexes to identify candidate item definitions.

45. A computer system for identifying an item definition that matches an item description, comprising:
means for providing one or more rules that specify how to generate a similarity score based on similarity between the item definition and an item description;
means for generating a similarity score for the item definition and the item description and each of a plurality of item definitions in accordance with the rules, wherein a score is assigned to the attributes of the item definition and the item description, and scores of the attributes are aggregated to derive the similarity score; and
means for selecting the item definition whose generated similarity score indicates it is most similar to the item description as the matching item definition.

46. The computer system of claim 45 wherein an item definition and an item description have attributes with values and wherein a rule indicates how to generate a similarity score based on similarity between the values of the attributes of the item definition and the item description.

47. The computer system of claim 45 wherein a rule includes one or more filters, each filter specifying how to generate a filter similarity score, wherein the similarity score for an item definition is the filter similarity score that indicates the item definition is most similar to the item description.

48. The computer system of claim 47 wherein an item definition and an item description have attributes with values and wherein a filter specifies an attribute scoring technique for one or more attributes that generates an attribute similarity score for that attribute and specifies how to combine the generated attribute similarity scores to generate a filter similarity score.

49. The computer system of claim 45 wherein a rule includes one or more filters, each filter specifying how to identify item definitions that are similar to the item description.

50. The computer system of claim 49 wherein a filter specifies a threshold filter similarity score that indicates the threshold similarity score for that filter needed for a match.

51. The computer system of claim 49 wherein a filter specifies a maximum number of item definitions that are to be identified as matching based on the filter.

52. The computer system of claim 45 including means for providing a potentially matching threshold similarity score for an item definition to be considered as potentially matching the item description.

53. The computer system of claim 45 including mean for identifying those item definitions as ambiguously matching item definitions when more than one item definition has a similarity score that indicates it is a match.

* * * * *